3,536,471
SOIL-TREATING MATERIAL AND METHODS
FOR MAKING AND USING THE SAME
Charles N. Ashley, Kearney, Nebr., assignor to Cu-Fe-Co Manufacturing, Inc., Kearney, Nebr., a corporation of Nebraska
No Drawing. Filed Mar. 9, 1967, Ser. No. 621,775
Int. Cl. C05f 11/08
U.S. Cl. 71—8          10 Claims

ABSTRACT OF THE DISCLOSURE

A soil-treating material including a combination of a grain carrier, yeast and certain metal sulfates and techniques for manufacturing and using the same. The disclosed soil treatment improves chemical and biological balance of the soil, functions to provide better moisture retention and results in improved yield.

BACKGROUND OF THE INVENTION

This invention relates to the treatment of soil, and relates more particularly to a soil-treating material and methods for making and using the same. Techniques for synthetically modifying soils to be utilized for the growth of plant life are quite common and generally include the addition to the soil of certain plant nutrients in the form of fertilizers. Conventional fertilizers ordinarily contain mixtures of nitrogen, phosphorous and potassium and thus, are commonly known as N-P-K mixtures. Fertilizers consisting of only one of these materials are also used in very high volume such as, for example, ammonium nitrate, anhydrous ammonia, superphosphate and potassium sulfate. Various compositions have been suggested in the prior art which modify the basic N-P-K mixtures and which add thereto, or substitute therefor, other plant nutrient materials. However, in general, common techniques for fertilizing the soil are concerned primarily with replacing certain chemical constituents of the soil which may have been depleted by prior agriculture use or adding to the soil certain chemical compounds which function to improve the nutrient value of the soil for plant growth.

In addition to utilizing fertilizer (and other chemical additives such as, for example, insecticides and weed killers), it has been common in some instances to cover the soil with a mulch. Such materials function primarily to decrease evaporation of moisture from the soil as well as preventing freezing of the plant roots. Mulches are generally utilized merely as a ground cover and do not otherwise affect the composition of the soil to any significant degree.

It is well recognized that there are many strains of bacteria present in the soil which are an important element to proper agricultural development. However, what may not be so well recognized is the fact that the bacterial balance, like the chemical balance of the soil, may be disturbed, particularly after prolonged agricultural use. The repeated use of chemical fertilizers, herbicides, etc. has created a condition where many bacteria are killed or rendered dormant. In time, a soil may become depleted of certain strains of bacteria or of certain nutrients for the bacteria thereby causing an undesirable imbalance in the soil composition. This imbalance, in turn, results in poor yield of the agricultural products either from the standpoint of total quantity on a volume basis, or total solids in a given volume of agricultural products. To further understand this concept, it should be recognized that, for example, the total number of bushels of a particular grain per acre is not always a proper test for the yield. In one instance, a bushel of grain from a particular field may weigh more than a bushel of similar grain from a different field. In effect, the former bushel has a higher "specific gravity" than the latter bushel indicating greater total solids content. Thus, the "specific gravity" as well as the volume must be considered in determining the actual yield realized.

In addition to the above problems with soil composition, it is common experience that certain soils may be highly acidic in nature whereas other soils may be highly alkaline. In general, when a soil approaches either extreme of acidity or alkalinity, its ability to function effectively in agricultural growth is diminished greatly.

These, and other, difficulties encountered in agricultural development provide rather complex problems which have not been satisfied by conventional use of fertilizers or mulches. Thus, there is a real need for a soil-treating material or composition which can effectively deal with many of these troublesome areas.

SUMMARY OF THE INVENTION

Thus, considering the foregoing, it is a primary object of this invention to provide a material for the treatment of soil which overcomes the aforementioned, and other such difficulties commonly encountered under present agricultural practices. Primarily, the instant invention is intended to provide a soil-treating material and techniques for using the same which have a tendency to balance the soil both chemically and biologically. The soil treatment of this invention, in addition to improving the nutrient value of the soil for plant growth further functions to buffer the soil thereby more nearly neutralizing the same. The bacterial balance in the soil is improved by adding enzymatic material to the soil and by activating bacterial strains in the soil which have become dormant.

Yet another object of the instant invention is the provision of a material and techniques for utilizing the same which functions in the manner of a mulch to improve water retention by the soil precluding burning of the soil during periods of prolonged dry weather.

It is a further object of this invention to provide techniques for the manufacture of a soil-treating composition of the type described, which techniques are relatively simple and inexpensive, utilizing readily available constituents in a highly efficient manner, whereby the material may be produced at low cost for large scale agricultural use.

Other and further objects reside in the specific constituents and quantitative amounts of each constituent utilized in the soil-treating material of this invention as well as in the specific manipulative steps utilized in the production and use of the soil-treating material.

Still other objects will in part be obvious and in part be pointed out as the description of the invention proceeds.

DESCRIPTION OF THE PREFERRED EMBODIMENTS

One ton of soil-treating material according to the instant invention is preferably prepared as follows:

To approximately 10–15 gallons water at a temperature of from 100–110° F. is added about 20 pounds of deactivated dry yeast. The yeast is preferably a conventional baker's yeast (*Saccharomyces cerevisiae*), a particularly useful material being "Red Star" produced by Universal Food Products, Milwaukee, Wis.

The yeast is mixed into the water for about 3–4 minutes in any conventional manner, the foaming of the solution evidencing the production of a gas. The following materials, all in their water soluble form, are then added to the yeast solution and mixed for an additional 3–4 minutes to dissolve the same:

(a) Approximately 35 pounds of manganese sulfate, (b) Approximately 4.6 pounds of iron sulfate,
(c) Approximately 8.8 pounds of zinc sulfate,
(d) Approximately 2.5 pounds of copper sulfate, and
(e) Approximately 1.3 pounds of cobalt sulfate.

The above solution is uniformly distributed over about 200 pounds of a finely divided grain, preferably approximately a 50/50 mixture of wheat bran and wheat standard middlings. However, it is to be understood that other finely divided grain materials can be utilized as the carrier including, for example, all wheat bran, all wheat standard middlings, grain sorghum, ground corn and mixtures of the same, the finely divided nature of these grains functioning to assist absorption of the solution of yeast and sulfates.

The grain carrying the aforementioned solution is dried in any conventional manner. With the yeast specified above, the temperature is preferably maintain below about 110° F. in order not to affect the bacteria of the yeast and a highly desirable technique for drying the grain is to spread the same in a thin layer to air dry in the sun.

Sufficient additional grain, which may be selected from any of the above materials, is blended with the dried material to produce a total of about one ton of the soil-treating material.

Alternatively, the mixed solution of yeast and soluble sulfates can be uniformly distributed over sufficiently finely divided grain to produce the entire ton of the soil-treating material initially, rather than merely distributing the same over a portion of the carrier and then blending the remainder of the carrier therewith.

The soil-treating material of the instant invention is applied to the soil, preferably approximately 20 pounds of the above composition per acre, and the material is then turned under, or worked into, the soil on the day of application. It is undesirable to merely cover the soil with the material so that it becomes wet. Further, working the material into the soil is important since the bacteria utilized function best in a low oxygen, low light atmosphere.

Although, for optimum results, approximately 20 pounds of the above composition are utilized for each acre, it has been found that so long as this quantity is not diminished by more than one half of the preferred amount, nor increased more than twice the preferred amount, the highly desirable results obtained according to the instant invention will still be realized. However, if less than approximately 10 pounds or if more than approximately 40 pounds of the above composition per acre is utilized, the desired results will not be obtained.

The soil-treating material of this invention is preferably applied prior to the first working of the soil after a harvest. This material is plowed into the soil as described above, and then the desired crop is planted. It is preferred to add the soil-treating material in the fall, although, when winter plowing is undesirable because of soil erosion, the material can be applied in the spring. For particularly acidic or alkaline soils, a first application can be made in the fall following the harvest and a subsequent application can be made in the spring prior to planting.

For normal useage, the material of the instant invention can be applied every other year, although, under special soil conditions, this procedure can be modified as necessary.

As mentioned previously, the soil treatment of the instant invention is particularly useful with highly acidic or alkaline soils since it has a tendency to neutralize such soils. However, such material may also be utilized advantageously with normal soils, whether they be sandy, loam or gumbo. Additionally, the soil treatment described herein has been found to be particularly effective regardless of the type of crop which is to be grown in the soil, since in any event, the chemical and biological balance of the soil is improved.

The theory of operation of the soil-treating material of this invention is not fully understood. Apparently, the material provides a rather complex enzymatic system which functions on the one hand to add bacteria to the soil and, on the other hand, to activate bacteria already in the soil which may have become dormant. It is possible that some of the constituents of the material function both as nutrients for the bacteria growth as well as nutrients for the plant growth. The bacteria in the yeast may act on the grain to form sugars which would function as a nutrient for further bacterial development.

Regardless of the theoretical operation, there clearly is an interaction between the various constituents, that is, the grain, the yeast and the various sulfates, since a similar use of each of the materials individually does not provide the desirable results which can be realized with the combination. In fact, the sum of the advantages produced by the individual constituents is overshadowed by the combined interaction evidencing a synergistic cooperation therebetween.

Besides apparently improving the chemical and biological balance of the soil the use of this material has been found to improve the color of the soil as well as the texture of the soil, particularly with the more compact soils. Further, a noticeably increased rate of decay of crop humus turned under is found with the use of the soil treatment of this invention.

Another extremely important improvement realized by treating the soil according to the techniques and with the material of this invention is the increased moisture-retaining ability of the soil whereby the material acts as a mulch in addition to chemically and biologically modifying the soil. Thus, during periods of prolonged dry weather a crop grown in treated soil is less likely to burn than a crop grown in untreated soil.

Obviously, one of the most significant considerations in an agricultural operation is in the yield. In tests utilizing the material of this invention according to the manner set forth hereinabove, approximately a 20 percent increase in solids in the crop produced in treated soil has been found when compared to the crop grown on a comparison plot that was untreated. This means, for example, that 80 loads of corn grown in soil treated according to this invention are substantially equal in yield to 100 loads of corn grown on an untreated plot. Thus, the "specific gravity" of the crop has been increased by about 20 percent, a very significant improvement from a commercial standpoint.

Another unusual phenonenon realized using the instant soil-treating techniques is that there is apparently little advantage, and in certain instances, there may even be some disadvantage, in adding ordinary chemical fertilizer to a soil which has been treated according to this invention. To date, equally as good results have been obtained by the sole use of the material of this invention as when this material and a chemical fertilizer were applied together. In fact, it is generally suggested that at least the application of a nitrogen-containing fertilizer to a plot treated according to this invention be avoided. In part, it is believed that the gaseous forms of nitrogen tend to destroy soil bacteria thereby defeating some of the advantages gained by the soil treatment described herein. Additionally, it is found that many soils have an oversupply of nitrogen, in the form of ammonia, and that this supply of nitrogen cannot be fully utilized by the plants grown therein. There is apparently every indication that if the soil is properly balanced, as results from the treatment hereof, there is no need for synthetic nitrogen to be added to the soil.

In summary, some of the advantages realized with the soil treatment defined herein are as follows:

(1) Better soil texture—the soil becomes more mellow and close visual examination can detect a change in color;

(2) Better moisture retention—mellow soils have less evaporative loss;

(3) Less burnout during dry season—due to better moisture retention of a more mellow soil chemical burnout is obviated;

(4) Speeded decomposition of crop residues—increased bacterial action hastens the breakdown of organic residues;

(5) Increased availability of mineral nutrient—the increased bacterial action resulting from the treatment set forth herein is believed to improve the solubility of minerals already present in the soil;

(6) Increased mineral uptake into growing plant—by striking a better nutrient balance in the soil, the treatment of this invention is believed to promote a stronger enzyme system in the plant itself;

(7) Better root structure—a more compact root structure with a marked increased in feed root structure is seen because of more readily available soil nutrients; and (8) Increased "specific gravity" of harvested crop—this, of course, is one of the most important advantages of the instant invention.

Thus, it will now be seen that there is herein provided an improved soil-treating material as well as improved techniques for manufacturing and utilizing the same, all of which satisfy the various objectives of the instant invention set forth hereinabove and others, including many advantages of great practical utility and commercial importance.

Since many embodiments may be made of the instant inventive concepts, and since many modifications may be made of the embodiments hereinbefore described without departing from the instant inventive concepts, all matter herein is to be interpreted as illustrative rather than as limiting.

Accordingly, what is claimed is:

1. A process for treating soil comprising adding from approximately 10 to approximately 40 pounds per acre of a material containing, per ton, approximately 20 pounds of yeast, approximately 35 pounds of manganese sulfate, approximately 4.6 pounds of iron sulfate, approximately 8.8 pounds of zinc sulfate, approximately 2.5 pounds of copper sulfate and approximately 1.3 pounds of cobalt sulfate, the remainder consisting essentially of a finely divided grain, and turning said material under the soil.

2. The process of claim 1 wherein said yeast and said sulfates are carried by at least a portion of said grain.

3. The process of claim 1 wherein said grain is a substantially equal mixture of wheat middlings and wheat bran.

4. The process of claim 1 wherein said yeast is a *Saccharomyces cerevisiae* yeast.

5. The process of claim 1 wherein said material is added to, and turned under, the soil prior to the first working of the soil following a harvest.

6. The process of claim 1 wherein approximately 20 pounds of said material are added to, and turned under, the soil per acre.

7. A soil-treating material comprising, per ton, approximately 20 pounds of yeast, approximately 35 pounds of manganese sulfate, approximately 4.6 pounds of iron sulfate, approximately 8.8 pounds of zinc sulfate, approximately 2.6 pounds of copper sulfate, approximately 1.3 pounds of cobalt sulfate, the remainder consisting essentially of a finely divided grain.

8. The material of claim 7 wherein said yeast and said sulfates are carried by at least a portion of said grain.

9. The material of claim 7 wherein said grain is a substantially equal mixture of wheat middlings and wheat bran.

10. The material of claim 7 wherein said yeast is a *Saccharomyces cerevisiae* yeast.

References Cited

UNITED STATES PATENTS

| 1,411,088 | 5/1921 | Guy | 71—6 |
| 1,898,350 | 2/1933 | Dyer | 71—8 |
| 2,797,985 | 7/1957 | Larson | 71—8 |

REUBEN FRIEDMAN, Primary Examiner

R. BARNES, Assistant Examiner

U.S. Cl. X.R.

71—1, 23, 63